Jan. 24, 1967   J. R. HARNISH ET AL   3,299,661
CHECK VALVE MANIFOLDS FOR HEAT PUMPS
Filed Oct. 18, 1965   2 Sheets-Sheet 1
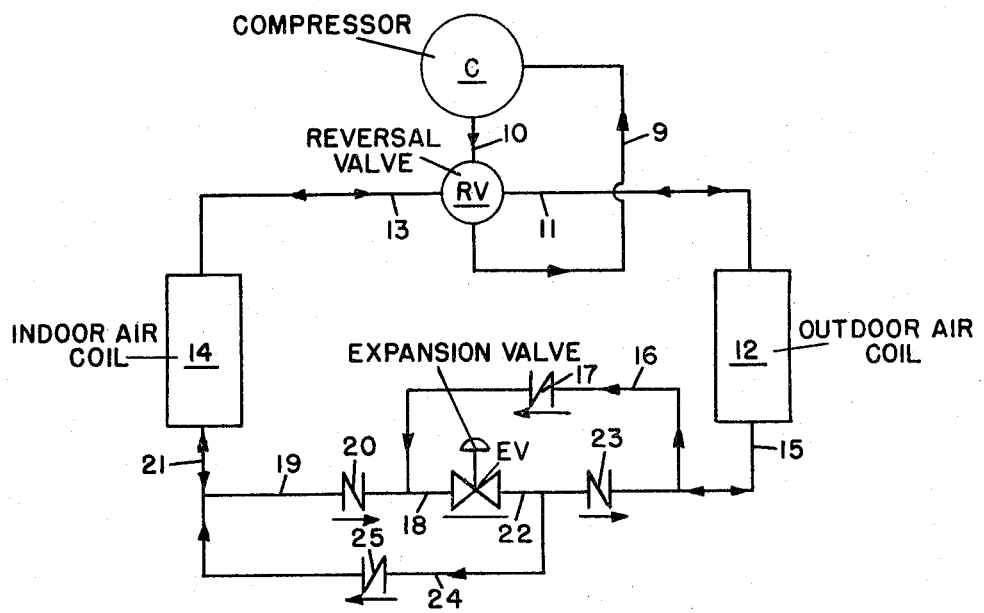
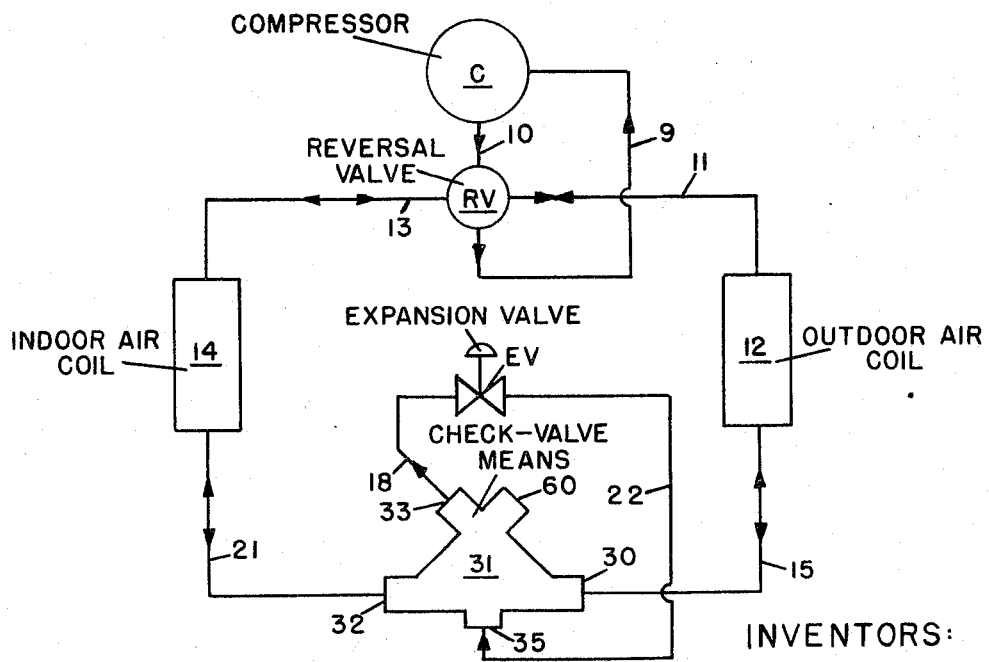
INVENTORS:
JAMES R. HARNISH,
ROBERT W. AYLING,
BY Robert O. Palmer
ATTORNEY

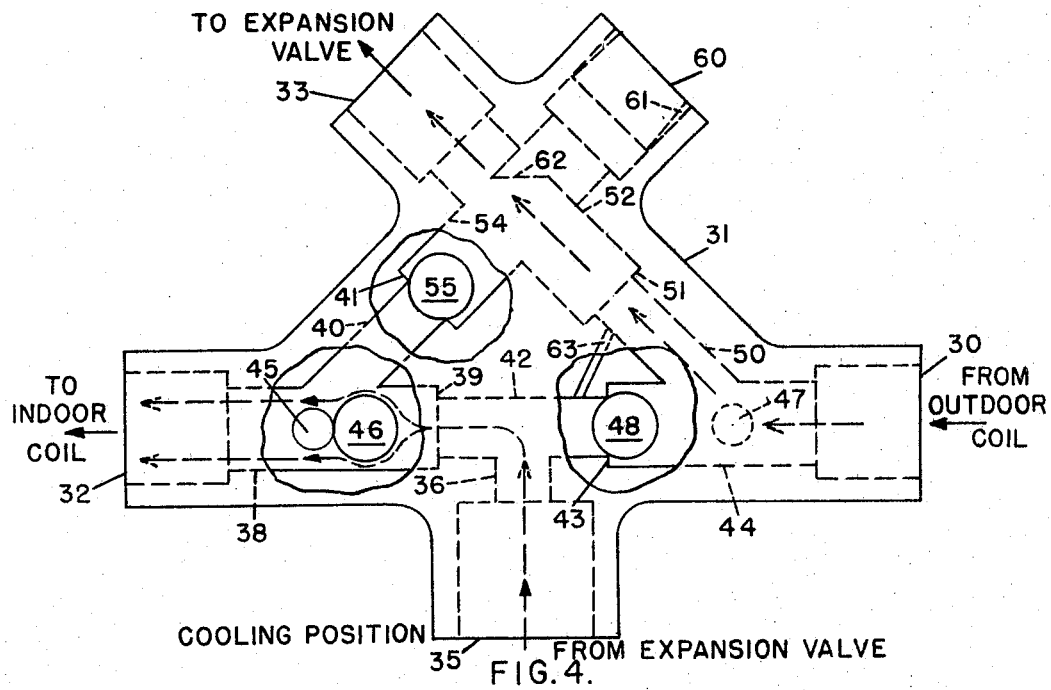
FIG. 3. COOLING POSITION
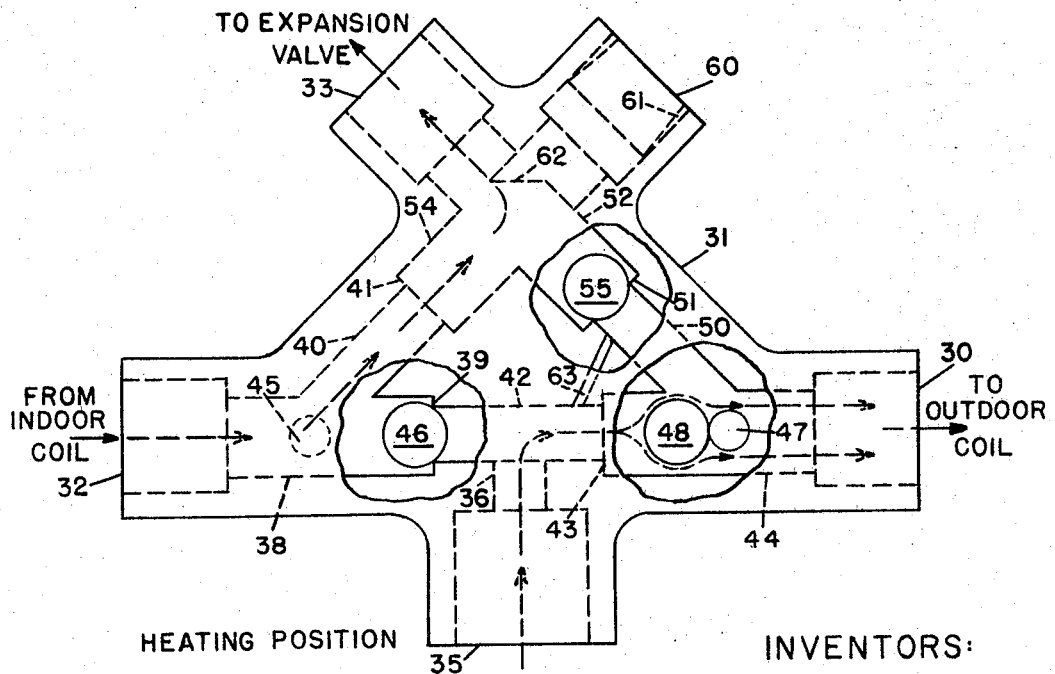
FIG. 4. HEATING POSITION
INVENTORS:
JAMES R. HARNISH,
ROBERT W. AYLING,
BY 
ATTORNEY United States Patent Office 3,299,661
Patented Jan. 24, 1967

3,299,661
CHECK VALVE MANIFOLDS FOR HEAT PUMPS
James R. Harnish and Robert W. Ayling, Staunton, Va., assignors to Westinghouse Electric Corporation, Pittsburgh, Pa., a corporation of Pennsylvania
Filed Oct. 18, 1965, Ser. No. 497,128
10 Claims. (Cl. 62—324)

This invention relates to heat pumps, and relates more particularly to check valve means for heat pumps.

A conventional heat pump using a single, one-way expansion valve, requires four separate check valves for routing the refrigerant in the proper directions during cooling and heating operation. This invention simplifies the piping of, reduces the space required for, and reduces the cost of such a heat pump by combining the functions of the four check valves in a single manifold. In one embodiment of this invention, this is accomplished by using three spherical balls which are seated on and unseated from valve seats by changes in the direction of refrigerant flow.

An object of this invention is to combine in a single manifold, the functions of a plurality of check valves.

This invention will now be described with reference to the annexed drawings, of which:

FIG. 1 is a circuit schematic of a conventional heat pump using four check valves;

FIG. 2 is a circuit schematic of a heat pump using a check valve manifold embodying this invention;

FIG. 3 is a side view, with portions of the adjacent side wall removed, and with passages shown by dashed lines, of the manifold of FIG. 2 on an enlarged scale, and with the balls within the manifold in positions for cooling operation, and FIG. 4 is a view similar to FIG. 3 except that the balls within the manifold are shown in positions for heating operation.

Referring first to FIG. 1 of the drawings, the suction side of a refrigerant compressor C is connected by a suction gas line 9 to a conventional reversal valve RV which is connected by a discharge gas line 10 to the discharge side of the compressor C. The valve RV is connected by a line 11 to one end of outdoor air coil 12, and by a line 13 to one end of an indoor air coil 14. The other end of the coil 12 is connected by a line 15 to line 16 containing a check valve 17, and by line 18 to the inlet of expansion valve EV. The line 18 is also connected by line 19 containing a check valve 20, and by line 21 to the other end of the coil 14. The outlet of the valve EV is connected to line 22 which is connected by check valve 23 to the line 15. The line 22 is also connected by line 24 containing a check valve 25 to the line 21.

During the indoor air cooling operation of FIG. 1, the valve RV routes refrigerant gas from the compressor C, through the line 11 into the outdoor air coil 12 operating as a condenser coil. Liquid from the coil 12 flows through the lines 15 and 16, the check valve 17 and the line 18 into the expansion valve EV which supplies expanded refrigerant through the lines 22 and 24, the check valve 25 and the line 21 into the indoor air coil 14 operating as an evaporator coil. Gas from the coil 14 flows through the line 13, the valve RV and the line 9 to the suction side of the compressor C.

During the indoor air heating operation of FIG. 1, the valve RV routes refrigerant gas from the compressor C through the line 13 into the indoor air coil 14 operating as a condenser coil. Liquid from the coil 14 flows through the lines 21 and 19, the check valve 20 and the line 18 into the expansion valve EV which supplies expanded refrigerant through the line 22, the check valve 23 and the line 15 into the outdoor air coil 12 operating as an evaporator coil. Gas from the coil 12 flows through the line 11, the valve RV and the line 9 to the suction side of the compressor C.

Referring now to FIG. 2 of the drawings, components of which have the same reference characters as corresponding components of FIG. 1, the suction side of compressor C is connected by line 9 to reversal valve RV which is connected by line 10 to the discharge side of the compressor C. The valve RV is connected by line 11 to one end of outdoor air coil 12, and by line 13 to one end of indoor air coil 14. The other end of the coil 12 is connected by line 15 to port 30 of manifold 31. The other end of the coil 14 is connected by line 21 to port 32 of the manifold 31. Inlet of expansion valve EV is connected by line 18 to port 33 of the manifold 31. The outlet of the expansion valve EV is connected by line 22 to port 35 of the manifold 31.

Referring now to FIGS. 3 and 4 of the drawings, the port 32 of the manifold 31 is connected by a cylindrical passage 38 to a valve seat 39. The passage 38 is connected by a cylindrical passage 40 having a smaller diameter than the passage 38, to a valve seat 41. The axis of the passage 40 is at an angle of about 45° to the axis of the passage 38, and is inwardly inclined. The valve seat 39 is connected by a cylindrical passage 42 concentric with and having a smaller diameter than the passage 38, to a valve seat 43 which is connected by a passage 44 similar to the passage 38 and axially aligned with it and the passage 42, to the port 30 of the manifold 31. The passage 38 contains a ball stop rod 45, and contains a spherical ball 46 between the rod 45 and the valve seat 39. The passage 44 contains a ball stop rod 47, and contains a spherical ball 48 between the rod 47 and the valve seat 43. The port 35 is connected by a cylindrical passage 36 having the same diameter as the passage 42 to the latter at the longitudinal center thereof. The passage 44 is connected by a cylindrical passage 50 having the same diameter as the passage 40, to a valve seat 51 which is connected by a cylindrical passage 52 having a larger diameter than the passage 50, to the port 33 of the manifold 31. The passages 50 and 52 have a common axis which is at an angle of about 45° to the axis of the passage 44, and is inwardly inclined so that it intersects the axis of the passage 40 at an angle of about 90°. The valve seat 41 is connected by a cylindrical passage 54 concentric with the passage 40, and having the same diameter as the passage 52, to the latter. A spherical ball 55 is adapted to be moved by the flow of refrigerant through the passage 54 into the passage 54 onto the valve seat 41 as shown by FIG. 3, or by the flow of refrigerant through the passage 54 into the passage 52 onto the valve seat 51 as shown by FIG. 4.

Alongside the port 33 is a dummy port 60 which has an axis aligned with the axis of the passage 54, and which connects through the passage 52 with the passage 54. The port 60 is closed by a cap 61, and is provided only for providing access to the interior of the manifold 31 for machining operations. The cap 61 has an inwardly protruding extension with a flat surface 62 machined on a 45° angle which serves as a stop for the ball 55.

A bleed passage 63 connects the passages 42 and 50 for permitting the compressor discharge and suction pressures to equalize during shut-downs as will be described later.

In the operation of FIGS. 2, 3 and 4, when the reversal valve RV is adjusted to operate the outdoor air coil 12 as a condenser coil, and to operate the indoor air coil 14 as an evaporator coil for indoor air cooling, the high pressure liquid from the coil 12 flows through the line 15 into the port 30, forcing the ball 48 to seat on the valve seat 43, and forcing the ball 55 to seat on the valve seat 41 as shown by FIG. 3. Refrigerant liqquid flows through the passages 50 and 52, the port 33 and the line 18 to the inlet of the expansion valve EV. Refrigerant from the expansion valve EV flows at a lower pressure through the line 22, the port 35, and the passages 36 and 42, unseating the ball 46 from the valve seat 39 so that refrigerant can flow through the passage 38, the port 32 and the line 21 into the indoor air coil 14 operating as an evaporator coil.

When the reversal valve RV is adjusted to operate the indoor air coil 14 as a condenser coil, and the outdoor air coil 12 is an evaporator coil for indoor air heating, the high pressure liquid from the coil 14 flows through the line 21 and port 32 into the passage 38, forcing the ball 46 to seat on the valve seat 39, and forcing the ball 55 to seat on the valve seat 51 as shown by FIG. 4. Refrigerant liquid flows through the passages 38, 40 and 54, the port 33 and the line 18 to the inlet of the expansion valve EV. Refrigerant from the expansion valve flows at a lower pressure through the line 22, the port 35, the passages 36, 42 and 44, unseating the ball 48 from the valve seat 43, and moving the ball 48 against the stop rod 47, so that refrigerant can flow through the passage 44, the port 30 and the line 15 to the outdoor air coil 12 operating as an evaporator coil.

When using a conventional solenoid-adjusted, reversal valve, the solenoid of which is deenergized when the associated thermostat stops the compressor during indoor air heating operation, the reversal valve is adjusted to its indoor air cooling position. The pressures in the indoor and outdoor coils quickly equalize, resulting in a small pressure differential across the compressor so that it can be restarted by a motor having a low starting torque.

When the compressor stops while operating on the cooling cycle, the reversal valve does not change position since its solenoid is deenergized during cooling operation. The pressures within the indoor and outdoor coils slowly equalize, resulting in a large pressure differential across the compressor so that it cannot be restarted by a low torque motor for a relatively long period of time. To overcome this problem, the bleed passage 63 is provided. The passage 63 connects the passages 50 and 42, providing a small, parallel bypass around the valve seat 43 which is closed by the ball 48 during cooling operation. On shutdown during cooling operation, refrigerant pressure in the outdoor coil 12 and in the indoor coil 14 will equalize in approximately three minutes so that a low starting torque motor can restart the compressor three minutes after it is stopped. During cooling operation, the bleed passage 63 is in parallel with the expansion valve, but it is relatively small and has insignificant effect on the operation of the expansion valve.

During heating operation when the outdoor ambient temperature is low so that the refrigerant flow rate is small, bypassing the expansion valve would be unsatisfactory since it might result in overfeeding the outdoor coil 12 operating as an evaporator coil. The bleed passage 63 is in parallel with the open valve seat 43 during such operation so that there is no by-pass around the expansion valve.

What is claimed is:

1. In a heat pump having a refrigerant compressor; an outdoor heat exchanger; an indoor heat exchanger, reversal valve means connected to said compressor and to said exchangers for routing discharge gas from said compressor into said outdoor exchanger to operate said outdoor exchanger as a condenser, and for routing suction gas from said indoor exchanger operating as an evaporator to said compressor, or for routing discharge gas from said compressor into said indoor exchanger to operate said indoor exchanger as a condenser, and for routing suction gas from said outdoor exchanger operating as an evaporator to said compressor; and an expansion valve; the combination of a manifold having a first port connected to said outdoor exchanger, having a second port connected to said indoor exchanger, having a third port connected to the outlet of said expansion valve, and having a fourth port connected to the inlet of said expansion valve; means within said manifold including means responsive to the flow of refrigerant through said first port when said outdoor exchanger is operating as a condenser for routing the refrigerant to said fourth port and preventing the refrigerant from flowing to said second and third ports, including means responsive to the flow of refrigerant through said second port when said indoor exchanger is operating as a condenser for routing the refrigerant to said fourth port and preventing the refrigerant from flowing to said first and third ports, and including means responsive to the flow of expanded refrigerant through said third port for routing the expanded refrigerant to said second port when said outdoor exchanger is operating as a condenser, and for routing the expanded refrigerant to said first port when said indoor exchanger is operating as a condenser.

2. The invention claimed in claim 1 in which there is provided means including a bleed passage within said manifold connecting said first and third ports when said outdoor exchanger is operating as a condenser.

3. In a heat pump having a refrigerant compressor; an outdoor heat exchanger; an indoor heat exchanger; reversal valve means connected to said compressor and to said exchangers for routing discharge gas from said compressor into said outdoor exchanger to operate said outdoor exchanger as a condenser, and for routing suction gas from said indoor exchanger operating as an evaporator to said compressor, or for routing discharge gas from said compressor into said indoor exchanger to operate said indoor exchanger as a condenser, and for routing suction gas from said outdoor exchanger operating as an evaporator to said compressor; and an expansion valve; the combination of a manifold having a first port connected to said outdoor exchanger, having a second port connected to said indoor exchanger, having a third port connected to the outlet of said expansion valve, and having a fourth port connected to the inlet of said expansion valve, having first passage means connecting said first and second ports, having second passage means connecting said first passage means and said third port, having first valve means in said first passage means between said first port and where said second passage means is connected to said first passage means, having second valve means in said first passage means between said second port and where said second passage means is connected to said passage means, having third passage means connected to said first passage means between said first port and said first valve means, having fourth passage means connected to said first passage means between said second port and said second valve means, having fifth passage means connected to said fourth port and to said third and fourth passage means, and having third valve means common to said third and fourth passage means, said first valve means being closed and said third valve means opening said third and closing said fourth passage means when refrigerant from said outdoor exchanger operating as a condenser flows into said first port, said second valve means being opened when expanded refrigerant flows into said third port when said outdoor exchanger is operating as a condenser; said second valve means being closed, said third valve means opening said fourth passage means and closing said third passage means when refrigerant from said indoor exchanger operating as a condenser flows into said second port, and said first valve means being opened when expanded refrigerant flows into said third port when said indoor exchanger is operating as a condenser.

4. The invention claimed in claim 3 in which a bleed passage is provided connecting said first passage means between said first and second valve means to said third passage means.

5. In a heat pump having a refrigerant compressor; an outdoor heat exchanger; an indoor heat exchanger; reversal valve means connected to said compressor and to said exchangers for routing discharge gas from said compressor into said outdoor exchanger to operate said outdoor exchanger as a condenser, and for routing suction gas from said indoor exchanger operating as an evaporator to said compressor, or for routing discharge gas from said compressor into said indoor exchanger to operate said indoor exchanger as a condenser, and for routing suction gas from said outdoor exchanger operating as an evaporator to said compressor; and an expansion valve; the combination of a manifold having a first port connected to said outdoor exchanger, having a second port connected to said indoor exchanger, having a third port connected to the outlet of said expansion valve, having a fourth port connected to the inlet of said expansion valve, having a first cylindrical passage connected at its outer end to said first port and having at its inner end a first valve seat, having a second cylindrical passage having substantially the same diameter as said first passage connected at its outer end to said second port and having a second valve seat at its inner end, having a third cylindrical passage with a diameter smaller than said diameter between and connected to said valve seats, said passages having a common axis, a first spherical ball in said first passage between said first port and said first valve seat, a second spherical ball in said second passage between said second port and said second valve seat, said manifold having a fourth cylindrical passage connecting said third port to said third passage, having a fifth cylindrical passage having substantially the same diameter as said third passage connected to and inclined inwardly at an angle to said first passage, having a sixth cylindrical passage having substantially the same diameter as said fifth passage connected to and inclined inwardly at an angle to said second passage, said fifth and sixth passages having intersecting axes, said manifold having a seventh cylindrical passage having substantially the same diameter as said first passage, concentric with and connected to said fifth passage and said fourth port, said manifold having an eighth cylindrical passage having substantially the same diameter as said seventh passage, said seventh passage having a third valve seat where it connects with said fifth passage, said eighth passage having a fourth valve seat where it connects with said sixth passage, and a third spherical ball common to said seventh and eighth passages; said first ball being seated on said first valve seat and said third ball being seated on said fourth valve seat by the flow of refrigerant through said first port when said outdoor exchanger is operating as a condenser, said second ball being unseated from said second valve seat by the flow of expanded refrigerant through said third port when said outdoor exchanger is operating as a condenser; said second ball being seated on said second seat and said third ball being seated on said third seat by the flow of refrigerant through said second port when said indoor exchanger is operating as a condenser, and said first ball being unseated from said first seat by the flow of expanded refrigerant through said third port when said indoor exchanger is operating as a condenser.

6. The invention claimed in claim 5 in which there is provided a bleed passage connecting said third and fifth passages.

7. A manifold having first, second, third and fourth ports, having first passage means connecting said first and second ports, having second passage means connected to said first passage mean and said third port, having first valve means in said first passage means between said first port and where said second passage means is connected to said first passage means, having second valve means in said first passage means between said second port and where said second passage means is connected to said first passage means, having third passage means connected to said first passage means between said first port and said first valve means and to said fourth port, having fourth passage means connected to said first passage means between said second port and said second valve means and to said third passage means, and having third valve means common to said third and fourth passage means; said first valve means being adapted to be closed, said third valve means being adapted to close said fourth passage means, and said second valve means being adapted to be opened when fluid at a predetermined pressure flows into said first port and fluid at a lower pressure flows into said third port; said second valve means being adapted to be closed, said third valve means being adapted to close said third passage means, and said first valve means being adapted to be opened when fluid at said predetermined pressure flows into said second port and fluid at said lower pressure flows into said third port.

8. A manifold as claimed in claim 7 in which a bleed passage is provided connecting said first passage means between said first and second valve means to said third passage means.

9. A manifold having first, second, third and fourth ports, having a first cylindrical passage connected at its outer end to said first port and having a valve seat at its inner end, having a second cylindrical passage having substantially the same diameter as said first passage connected at its outer end to said second port and having a second valve seat at its inner end, having a third cylindrical passage with a diameter smaller than that of said first passage between and connected to said valve seats, said passages having a common axis, a first spherical ball in said first passage between said first port and said first valve seat, a second spherical ball in said second passage between said second port and said second valve seat, said manifold having a fourth cylindrical passage connecting said third port to said third passage, having a fifth cylindrical passage having substantially the same diameter as said third passage connected to and inclined inwardly at an angle to said first passage, having a sixth cylindrical passage having substantially the same diameter as said fifth passage connected to and inclined inwardly at an angle to said second passage, said fifth and sixth passages having intersecting axes, said manifold having a seventh cylindrical passage having substantially the same diameter as said first passage, concentric with and connected to said fifth passage and to said fourth port, said manifold having an eighth cylindrical passage having substantially the same diameter as said seventh passage, concentric with and connected to said sixth passage and intersecting and connected to said seventh passage, said seventh passage having a third valve seat where it connects with said fifth passage, said eighth passage having a fourth valve seat where it connects with said sixth passage, and a third spherical ball common to said seventh and eighth passages, said first ball being seated on said first valve seat and said third ball being seated on said fourth valve seat by the flow of fluid at a predetermined pressure into said first port, said second ball being unseated from said second valve seat by the flow of fluid at a pressure lower than said pressure into said third port, said second ball being seated on said second valve seat and said third ball being seated on said third valve seat by the flow of fluid at said predetermined pressure into said second port, and said first ball being unseated from said first valve seat by the flow of fluid at said lower pressure into said third port.

10. A manifold as claimed in claim 9 in which there is provided a bleed passage connecting said third and fifth passages.

No references cited.

WILLIAM J. WYE, *Primary Examiner.*